(12) United States Patent
Burns et al.

(10) Patent No.: US 7,003,091 B1
(45) Date of Patent: Feb. 21, 2006

(54) RESOURCE ALLOCATION FOR SIMULTANEOUS HUNT GROUP

(75) Inventors: Robert R. Burns, Campbell, CA (US); Dale Tonogai, Los Altos, CA (US); Scott A. Van Gundy, Los Gatos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 520 days.

(21) Appl. No.: 10/370,915

(22) Filed: Feb. 21, 2003

(51) Int. Cl.
*H04M 3/523* (2006.01)

(52) U.S. Cl. .............................. 379/265.11; 379/211.04; 379/212.01

(58) Field of Classification Search ........... 379/211.04, 379/212.01, 265.01, 265.02, 265.11
See application file for complete search history.

(56) References Cited

U.S. PATENT DOCUMENTS

| | | | | |
|---|---|---|---|---|
| 5,515,428 A | * | 5/1996 | Sestak et al. | 379/266.01 |
| 5,557,667 A | * | 9/1996 | Bruno et al. | 379/211.04 |
| 6,404,885 B1 | * | 6/2002 | Field et al. | 379/266.04 |
| 6,466,661 B1 | * | 10/2002 | Krank et al. | 379/212.01 |
| 6,473,501 B1 | * | 10/2002 | Paulsrud | 379/157 |
| 6,751,310 B1 | * | 6/2004 | Crossley | 379/266.07 |
| 6,766,012 B1 | * | 7/2004 | Crossley | 379/265.02 |

* cited by examiner

Primary Examiner—Harry S. Hong
(74) Attorney, Agent, or Firm—Fenwick & West LLP (57) ABSTRACT

A simultaneous hunt group system and method are provided. A call status module notices an incoming call to a simultaneous hunt group and offers the call to a plurality of endpoints. One of the plurality of endpoints answers the call. After the call is answered, a resource allocation module allocates resources for a communications channel, and a call transfer module transfers the caller to the agent that answered the call.

20 Claims, 8 Drawing Sheets

Fig. 8

RESOURCE ALLOCATION FOR SIMULTANEOUS HUNT GROUP

TECHNICAL FIELD

This invention relates generally to distributed telephony and, more particularly, to resource allocation in a one-to-many call relationship.

BACKGROUND

Voice quality on an Internet protocol (IP) telephony network suffers if audio content exceeds the bandwidth of the network. Admission control is used to preallocate bandwidth on the network to ensure that voice quality is maintained. In a conventional preallocation system, a call that would cause the available resources to be exceeded is not allowed.

A distributed call center application may simultaneously offer a call to multiple agents or endpoints. In a simultaneous hunt group, only one endpoint will eventually receive the call. Conventional systems preallocate resources for all the endpoints, thereby inflating the actual use of the network. In a typical system that uses preallocation of resources, an inflated network can cause erroneous call denial because additional resources are unavailable for additional calls.

Additionally, because conventional systems preallocate resources for each of the multiple endpoints within the simultaneous hunt group, the resources required to implement the simultaneous hunt group is proportional to the number of endpoints in the group. Depending on network resources or topology, therefore, it may not be possible to have a simultaneous hunt group that includes a large number of endpoints.

What is therefore needed is a system and method for allocating resources for a simultaneous hunt group that does not over-allocate resources or cause erroneous call denial. What is further needed is a system and method in which the resources required for implementing a simultaneous hunt group are independent of the number of endpoints included in the simultaneous hunt group.

SUMMARY OF THE INVENTION

A simultaneous hunt group can be defined to include a group of endpoints (e.g., telephones) that ring at the same time responsive to an incoming call. The simultaneous hunt group enables a group of agents to receive or answer the incoming call on a first available basis. That is, the first agent to pickup the telephone receives the incoming call.

In an embodiment of the present invention, a system and method are provided for implementing a simultaneous hunt group without preallocating resources, such as bandwidth. A switch or server includes a call status module that notices an incoming call at a caller site. The call status module then determines which of several endpoints are part of the simultaneous hunt group and offers the call to the selected endpoints. In offering the call, the call status module informs other switches within the distributed architecture to cause the selected endpoints to ring. When one of the selected endpoints accepts or answers the call, a call transfer module allocates resources to establish a communications channel along a media path that reaches the endpoint that answered the call.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Overview

In certain voice communication environments, it can be desirable for an incoming voice call to ring multiple telephones at the same time. A simultaneous hunt group can be defined to include each of the endpoints (e.g., telephones) that ring at the same time. The simultaneous hunt group enables a group of agents to receive or answer the incoming call on a first available basis. For example, a simultaneous hunt group can be defined to include the telephones of 8 technical support agents. An incoming call to the technical support telephone number rings each of the 8 agent telephones concurrently. The first agent to pickup the telephone receives the incoming call. A simultaneous hunt group therefore offers an efficient way to distribute incoming calls for call center applications.

1. System Architecture

Figure 1A:
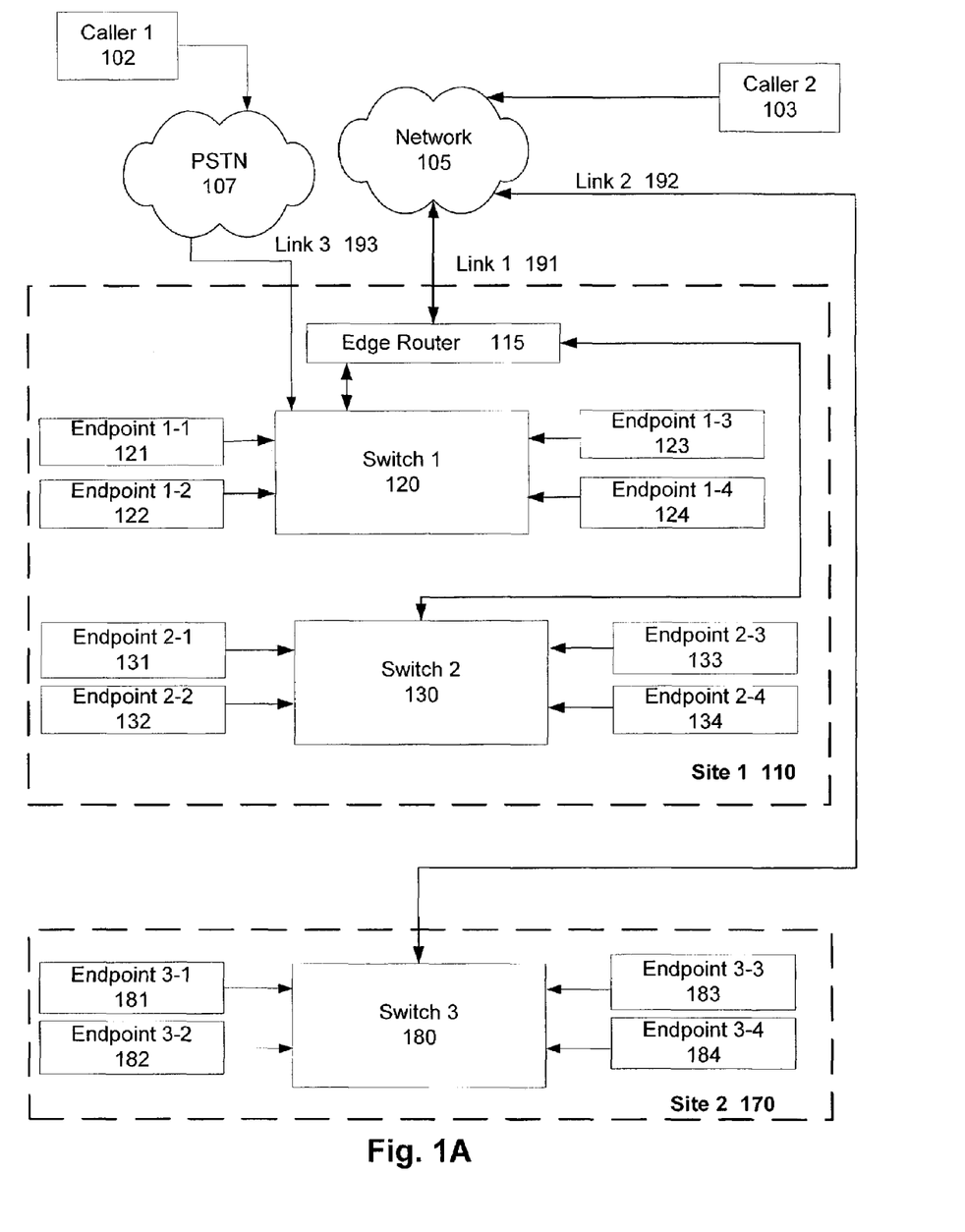
FIG. 1A is an illustration of a system architecture according to one embodiment of the present invention.

FIG. 1A is an illustration of a system architecture according to one embodiment of the present invention. The illustrated embodiment includes a first site 110 and a second site 170. As used herein, a site represents a grouping of resources. In one embodiment of the present invention, a site's connectivity to a wide area network is resource constrained (e.g., bandwidth limited). Within a site, however, a local area or other network provides sufficient resources such that admission control or preallocation of resources for communications channels is typically not required. More specifically, preallocation of resources is needed at site boundaries because of the contention for wide area networking resources on communication links that interconnect networks or sites. One skilled in the art will note that sites can be physically distinct from each other or merely topology-related groupings that are not in physically distinct locations.

The first site 110 includes an edge router 115, a first switch 120, and a second switch 130. The edge router 115 couples the first site 110 to a network 105 via a first link 191. Coupled to the first switch 110 are a number of endpoints (121, 122, 123, 124). Also coupled to the second switch 130 are a number of endpoints (131, 132, 133, 134). In one embodiment of the present invention, each endpoint represents a telephone device.

The first switch 120 is also coupled to a public switched telephone network (PSTN) 107 via a third link 193. In one embodiment of the present invention, the third link 193 is an analog or digital trunk line (e.g., a T1 or E1). In the illustrated configuration, the first switch 120 provides an interface for calls originating from or terminating on the public switched telephone network 107.

The second site 170 includes a third switch 180. Coupled to the third switch 180 are a number of endpoints (181, 182, 183, 184). The second site 170 is coupled to the network 105 via a second link 192. One skilled in the art will appreciate that the third switch 180 can be directly coupled to the network 105 without the use of a router because the second site 170 includes a single switch. The switches 120, 130, 180 enable the endpoints (121–124, 131–134, 181–184) to provide telephony services. Further details on how the endpoints can be coupled to the switches 120, 130, 180 are described below and with reference to FIGS. 2 and 4.

In one embodiment of the present invention, the network 105 is a partially public or a wholly public network such as the Internet. The network 105 can also be a private network or include one or more distinct or logical private networks (e.g., virtual private networks). Additionally, the illustrated communication links 191, 192 to the network 105 can be wireline or wireless (i.e., terrestrial- or satellite-based transceivers). In one embodiment of the present invention, the network 105 is an IP-based wide or metropolitan area network. Communications channels on links 191, 192 typically need to be preallocated because the links 191, 192 can be resource limited connections to the wide or metropolitan area network.

One skilled in the art will recognize that numerous configurations of switches and communications links are contemplated. For example, the public switched telephone network 107 can be coupled to multiple switches at several points within the topology.

Figure 1B:
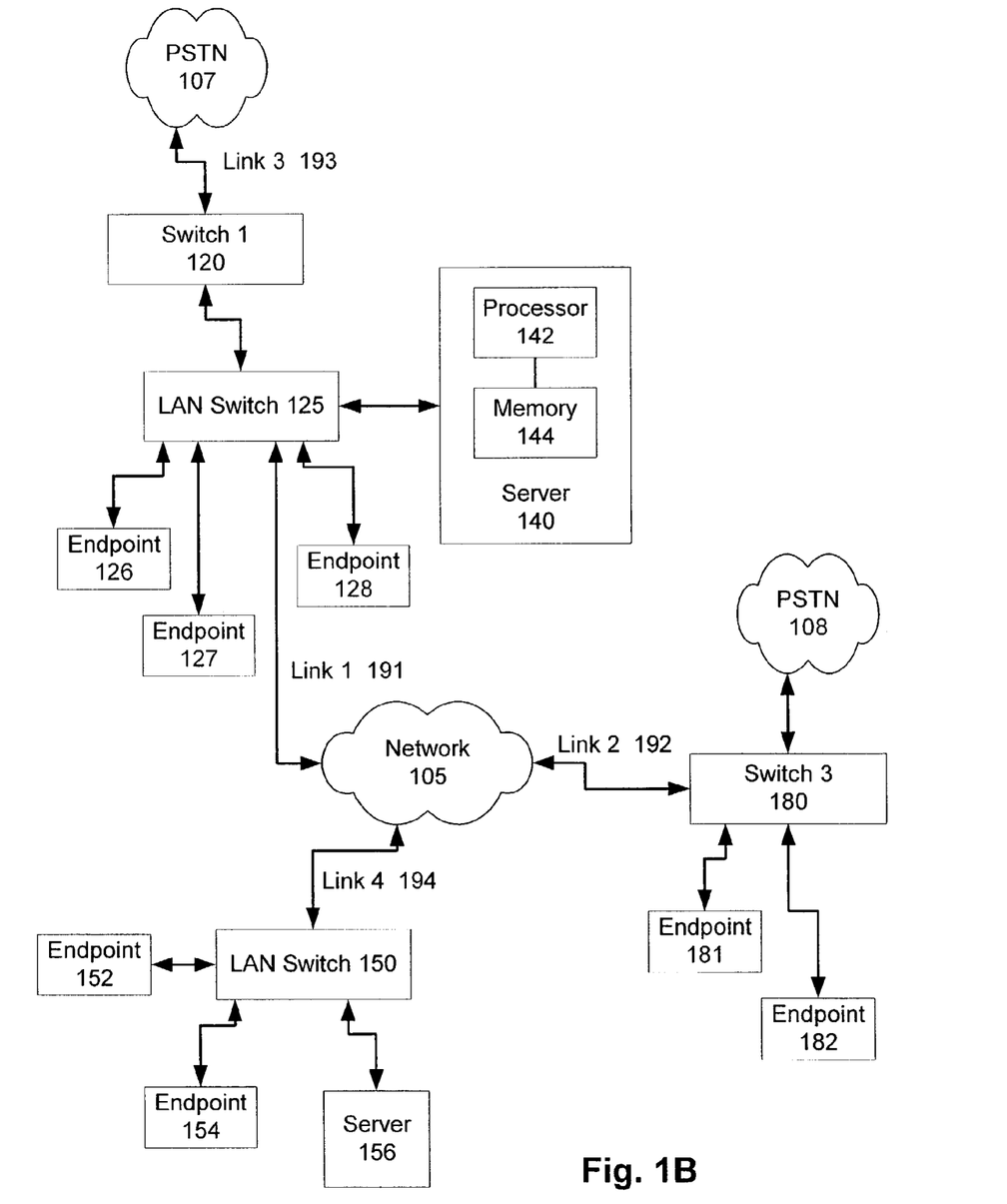
FIG. 1B is an illustration of a system architecture according to another embodiment of the present invention.

FIG. 1B is an illustration of a system architecture according to another embodiment of the present invention. The illustrated embodiment includes a first local area network (LAN) switch 125. The first LAN switch 125 can be a conventional physical or link layer (e.g., Ethernet) switch or hub. Similar to the embodiment illustrated in FIG. 1A, the first switch 120 is coupled to the PSTN 107 via the third link 193. The first switch 120 is also coupled to the first LAN switch 125.

Coupled to the first LAN switch 125 are a number of endpoints 126, 127, 128. The endpoints 126, 127, 128 represent IP telephones that communicate data packets with the first LAN switch 125. In one embodiment of the present invention, the endpoints 126, 127, 128 communicate with the first switch 120 to establish communications channels that are used to make and to receive telephone calls. More specifically, the first switch 120 manages call setup or resource allocation (as required) by provisioning a virtual extension for each of the endpoints 126, 127, 128. One skilled in the art will appreciate that a plurality of endpoints can be coupled to the first LAN switch 125 either directly or indirectly by using additional switches, hubs, etc.

FIG. 1B also includes a server 140 coupled to the first LAN switch 125. The server includes a processor 142 and a memory 144. The processor 142 can be a conventional processing device, such as a general-purpose microprocessor. The memory 144 includes program instruction and is described in further detail below and with reference to FIG. 3.

In one embodiment of the present invention, the server 140 is configured to implement features or functions of the present invention described below and with reference to FIGS. 6–8. For example, the server 140 can implement a workgroup service that performs distributed call center applications such as a simultaneous hunt group according to the present invention. More specifically, the workgroup service can monitor a virtual extension that maps to a set of endpoints that are included in the simultaneous hunt group. The server 140 can also implement a softswitch service that facilitates workgroup functionality within the distributed architecture.

The embodiment illustrated in FIG. 1B further includes a second LAN switch 150 coupled to the network 105 via a fourth link 194. Coupled to the second LAN switch 150 are two endpoints 152, 154 and a server 156. The endpoints 152, 154 are, for example, IP telephones. The server 156 can be architecturally similar to the server 140 described above. Functionally, the server 156 illustrates the distributed characteristics of the system architecture. For example, features or functions implemented by the server 140 can be shared with the server 156.

Similar to FIG. 1A, FIG. 1B illustrates the third switch 180 coupled to the network 105 via the second link 192. In this case, however, the third switch 180 is also coupled to a PSTN 108. This provides additional flexibility for placing and receiving calls via the PSTN.

2. System Function

In accordance with the present invention, the exemplary system of FIG. 1A performs as a distributed voice over Internet protocol (VoIP) architecture. The first switch 120 includes an interface to the public switched telephone network 107, which typically provides wide area connectivity. The first switch 120 constructs VoIP packets by placing voice data from the public switched telephone network 107 into VoIP packets for distribution within the first site 110 or the second site 170 using the network 105. The first switch 120 also deconstructs VoIP packets and provides the corresponding voice data to the public switched telephone network 107. That is, the first switch 120 bridges the network 105 and the public switched telephone network 107.

For example, the first switch 120 receives an incoming call from a first caller 102 via the public switched telephone network 107. In this example, the destination of the incoming call is endpoint 183 coupled to the third switch 180 and located in the second site 130. The first switch 120 located in the first site 110 functions as a VoIP gateway and establishes a connection between the first caller 102 and the destination endpoint 183. In establishing the connection, the first switch 120 performs a conventional admission control process to determine if the first site 110 and the second site 170 have sufficient available resources to establish the VoIP connection. If the sites 110, 117 have sufficient resources, then a bi-directional communications channel (or media path) is set up between the first switch 120 and the third switch 180. The first caller 102 and the agent at the destination endpoint 183 can then communicate over the established channel.

With reference to FIG. 1B, the third switch 180 provides an additional path for bridging the network 105 with the public switched telephone network 108. In one embodiment of the present invention, the server 140 includes call control features for routing calls to and from the PSTN 107 or 108. One skilled in the art will appreciate that call control functionality can also be included in the switch 120/130/180 as described in further detail below.

Additionally, the configuration illustrated in FIG. 1A or 1B can operate with IP telephony device originated or teminated calls. A second caller 103 can place a call on the network 105 using, for example, VoIP-enabled telephony device. Depending on the destination of the call, the media path includes one or more of the first, second, and third links 191, 192, 193. If the destination is coupled to the public switched telephone network 107, then the media path includes the first link 191 and the third link 193. The first switch 120 functions as a VoIP gateway to the public switched telephone network 107. If the destination is an endpoint within the first site 110 or the second site 170, then a communications channel is established with the corresponding switch. Although for clarity of FIG. 1A the second caller 103 is singularly illustrated, a plurality of VoIP devices can be coupled through various network infrastructure devices (e.g., switches and routers) to the network 105.

One skilled in the art will appreciate that in the packet-based architecture of the present invention, establishing a communications channel includes allocating resources (e.g., bandwidth and port designations) along a media path to connect a caller and a callee. For a typical telephone call, two communications channels can be established so that the caller and the callee can communicate bi-directionally. For clarity of the description of the present invention, a communications channel may be referred to singularly although one skilled in the art will recognize that two communications channels are desirable for bi-directional communications. The media path includes the communications links that are needed to connect the caller with the callee. Whether sites have available resources to establish a communications channel along the media path can depend upon the bandwidth of the communications links that connect those sites. Resource reservation (or admission control) is performed for each site on the media path to ensure that adequate throughput is maintained for the duration of the call.

B. Switch Architecture

Figure 2:
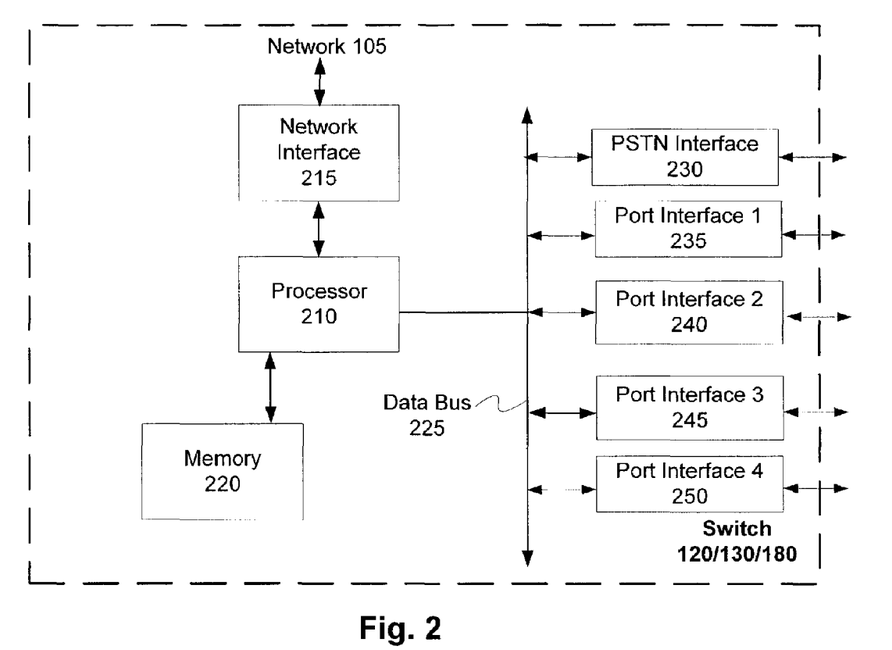
FIG. 2 is an illustration of one embodiment of a switch of FIG. 1A.

FIG. 2 is an illustration of one embodiment of a switch of FIG. 1A. In the illustrated embodiment, the switch 120/130/180 includes a processor 210, a network interface 215, and a memory 144/220. The processor 210 is shown coupled to the network interface 215, the memory 144/220, and a data bus. The data bus 225 includes a PSTN interface 230, a first port interface 235, a second port interface 240, a third port interface 245, and a fourth port interface 250.

The processor 210 can be a general-purpose microprocessor, a special-purpose microprocessing device (e.g., a microcontroller), or an application-specific integrated circuit (ASIC). As described in further detail below and with reference to FIG. 3, the memory 144/220 includes program instructions or modules stored therein. The program instructions can be distributed on a computer readable medium or storage volume. The computer readable storage volume can be available via a public network, a private network, or the Internet. Program instructions can be in any appropriate form, such as source code, object code, or scripting code.

The memory 144/220 can be a conventional storage device, such as electronic, optical, or magnetic memory. In one embodiment of the present invention, the program instructions configure the processor 210 to perform packet switching and other functions as described below.

The network interface 215 comprises an Ethernet interface, for example, that can be coupled to the network 105. One skilled in the art will recognize that the network interface 215 generally corresponds with the type of the network 105. In the example embodiments described above, the network 105 is an Ethernet network that includes transmission control protocol (TCP) and Internet protocol (IP) data. The processor 210 transmits and receives VoIP packets from the network interface 215.

The PSTN interface 230 is configured to couple to the public switched telephone network 107. In one embodiment of the present invention, the PSTN interface 230 comprises a framer/deframer for a T1/E1 circuit. For data flowing to the PSTN 107, the processor 210 extracts the voice data from VoIP packets and places the voice data on the data bus 225. The PSTN interface 230 frames the data and places it on the designated channel of the T1/E1 circuit. For data flowing from the PSTN 107, the PSTN interface 230 deframes the data and places it on the data bus 225. The processor 210 then packetizes the data from the data bus 225 and sends the packets to the network interface 215. In one example implementation, the processor 210 uses a standards-compliant VoIP packet structure.

In another embodiment of the present invention, the PSTN interface 230 comprises an analog trunk interface. As with the network interface 215, the PSTN interface 230 generally corresponds to and is compatible with the public switched telephone network 107.

In one embodiment of the present invention, the port interfaces 235, 240, 245, 250 each comprise a subscriber line interface circuit that can be coupled to a telephony device or endpoint. The telephony device can be a conventional analog telephone. The port interfaces 235, 240, 245, 250 can include circuits for interfacing with the data on the data bus 225. For example, the port interfaces 235, 240, 245, 250 include digital signal processors, digital to analog converters, or analog to digital converters for processing the analog signals associated with conventional telephony devices and interfacing those signals with the data bus 225. One skilled in the art will appreciate that although four port interfaces 235, 240, 245, 250 are shown, a plurality of port interfaces can be included for coupling a plurality of endpoints to the switch 120/130/180.

Figure 3:
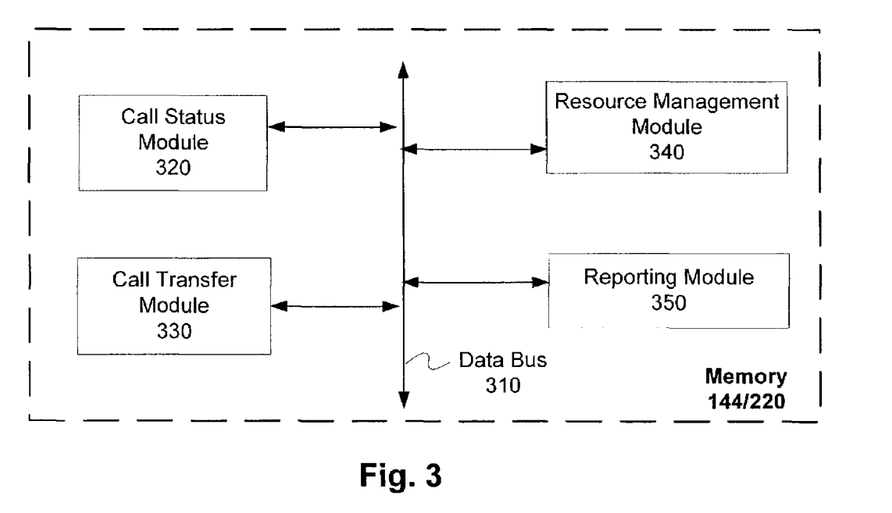
FIG. 3 is an illustration of one embodiment of modules within the memory of FIG. 2.

FIG. 3 is an illustration of one embodiment of modules within the memory of FIG. 2. The illustration includes several modules within the memory 144/220 that can be used to implement the features or functionalities of the present invention. The modules include a call status module 320, a call transfer module 330, a resource management module 340, and a reporting module 350. Exemplary functionality for each of these modules is now described.

The call status module 320 performs functions such as noticing endpoint pickup and offering the call to a simultaneous hunt group. The call transfer module 330 coordinates resource allocation and transfers the call to the endpoint that picked up or accepted the call. The resource management module 340 maintains information about a site's available bandwidth or usage load. The reporting module 350 produces messages about the success or failure of the resource allocation for establishing a communications channel. One skilled in the art will recognize that a computing device within the distributed architecture, such as the switch 120/130/180 and/or the server 140/156, can implement the functions of each of the modules. The functions of each of the modules are also described in further detail below and with reference to FIGS. 6–8.

Figure 4:
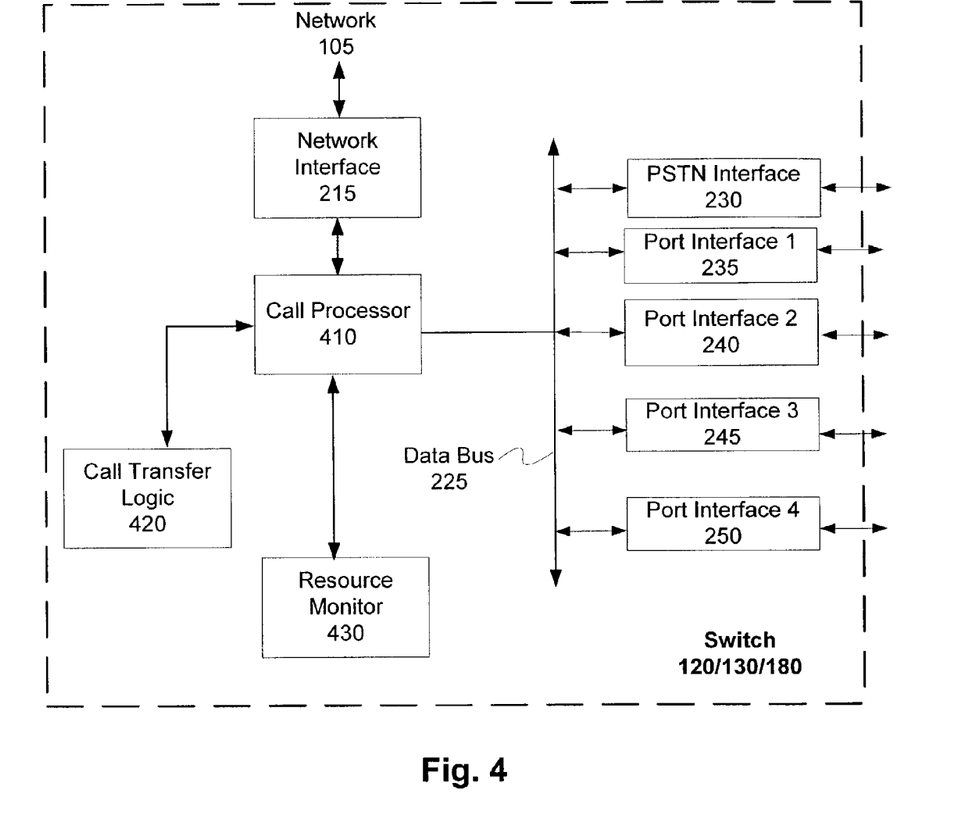
FIG. 4 is an illustration of another embodiment of a switch of FIG. 1A.

FIG. 4 is an illustration of another embodiment of a switch of FIG. 1A. In FIG. 4, the switch 120/130/180 includes a call processor 410, call transfer logic 420, and a resource monitor 430. Similar to the embodiment of the switch 120/130/180 illustrated in FIG. 2, FIG. 4 also includes a network interface 215 and a data bus 225. The data bus 225 includes a PSTN interface 230, a first port interface 235, a second port interface 240, a third port interface 245, and a fourth port interface 250.

The embodiment shown in FIG. 4 includes similar functionality to the embodiment of the switch 120/130/180 shown in FIG. 2. In FIG. 4, application-specific circuitry or a combination of hardware and software is used to implement, for example, the call status module 320, a call transfer module 330, a resource management module 340, and a reporting module 350. More specifically, the call transfer logic 420 performs the function of coordinating resource allocation for establishing a communications channel and transferring the incoming call. The resource monitor 430 maintains information about a site's available bandwidth or usage load.

The call processor 410 performs packet switching functions and coordinates the data flow to and from the network interface 215 and the data bus 225. The call processor 410 also performs call status functions, such as noticing endpoint pickup and offering an incoming call to a simultaneous hunt group.

C. Simultaneous Hunt Group

Figure 5:
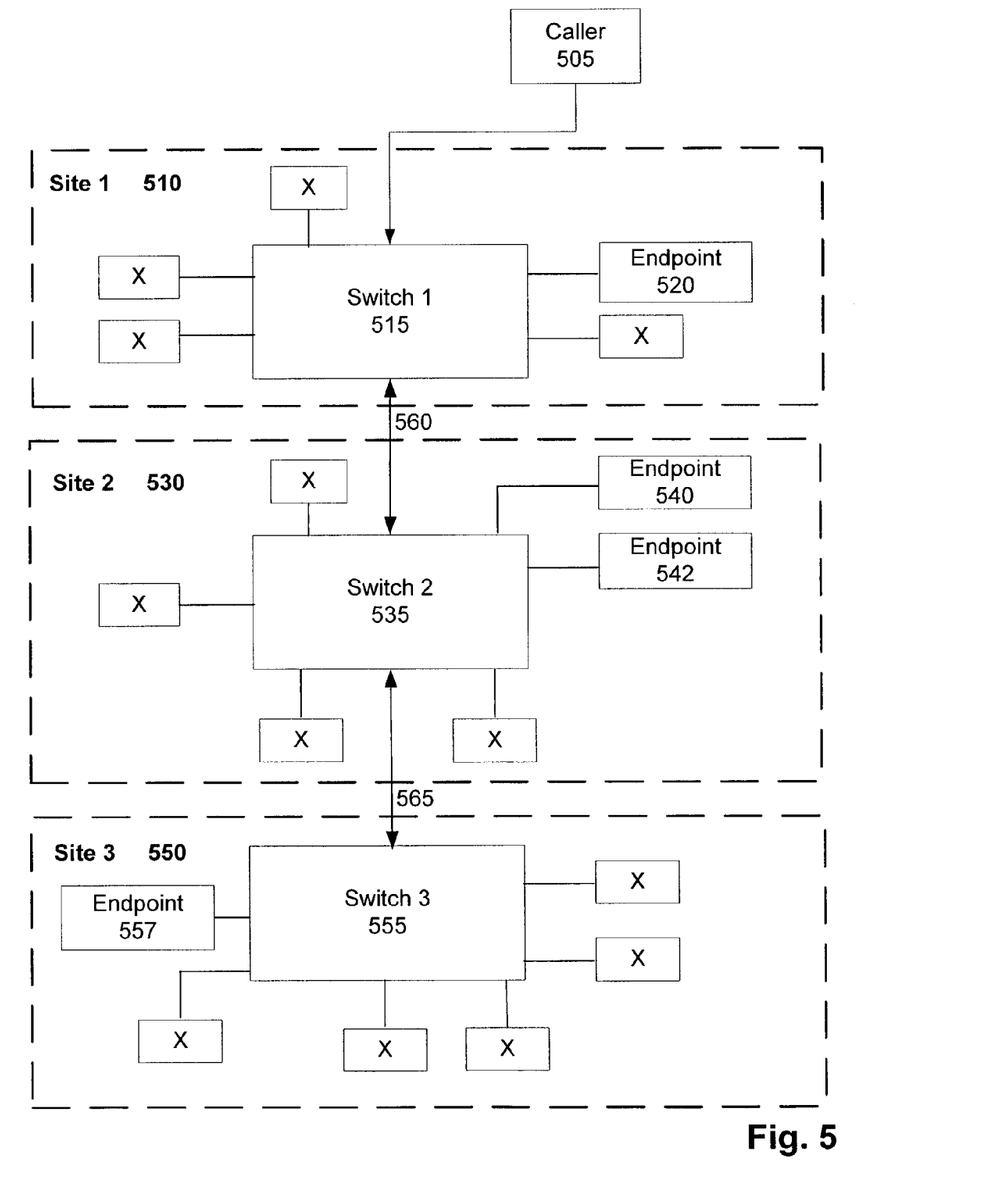
FIG. 5 is a system diagram illustrating a simultaneous hunt group in accordance with the present invention.

FIG. 5 is a system diagram illustrating a simultaneous hunt group in accordance with the present invention. In a simultaneous hunt group, a single incoming call is concurrently offered to a plurality of endpoints. Each of several agents that are stationed at the endpoints has an opportunity to answer the incoming call. The first agent to answer the call is connected to the caller.

FIG. 5 illustrates an example simultaneous hunt group in a distributed system architecture. A first site 510, a second site 530, and third site 550 are shown. The first site 510 includes a first switch 515. The second site 530 includes a second switch 535. The third site 550 includes a third switch 555. The first switch 515 communicates with the second switch 535 using a first link 560. The second switch 535 communicates with the third switch 555 using a second link 565. Although the first link 560 and the second link 565 are illustrated as both coupled to the second switch 535, one skilled in the art will appreciate that additional networking devices can be provided to facilitate the interconnection of the sites 510, 530, 550.

In the illustrated example, the simultaneous hunt group includes four endpoints 520, 540, 542, 557. That is, an incoming call from a caller 505 causes each of the four endpoints 520, 540, 542, 557 to ring simultaneously. More specifically, the first switch 515 receives the incoming call from the caller 505. In one embodiment of the present invention, the workgroup service executing on the server 140 notices the incoming call and offers the call to each of the four endpoints 520, 540, 542, 557. As described above, the server 140 includes program instructions for implementing a softswitch. One skilled in the art will recognize, therefore, that the server 140 can perform the steps or acts of a switch.

The first site 510 includes one endpoint 520, the second site 530 includes two endpoints 540, 542, and the third site 550 includes one endpoint 557. FIG. 5 also includes other endpoints that are not included in the defined hunt group. These endpoints are coupled to the switches 515, 535, 555 and are identified with an "X".

As described above, any one of the endpoints 520, 540, 542, 557 in the simultaneous hunt group can answer the call from the caller 505. For example, if endpoint 557 answers first, then the caller 505 is connected with the agent responsible for the endpoint 557. To transfer the caller 505 to the endpoint 557, a communications channel is established along a media path that includes the first link 560 and the second link 565. Therefore, the each of the three sites 510, 530, 550 need sufficient available resources in order to establish the communications channel and transfer the caller 505. Resource allocation is now described in further detail.

1. Resource Allocation

Figure 6:
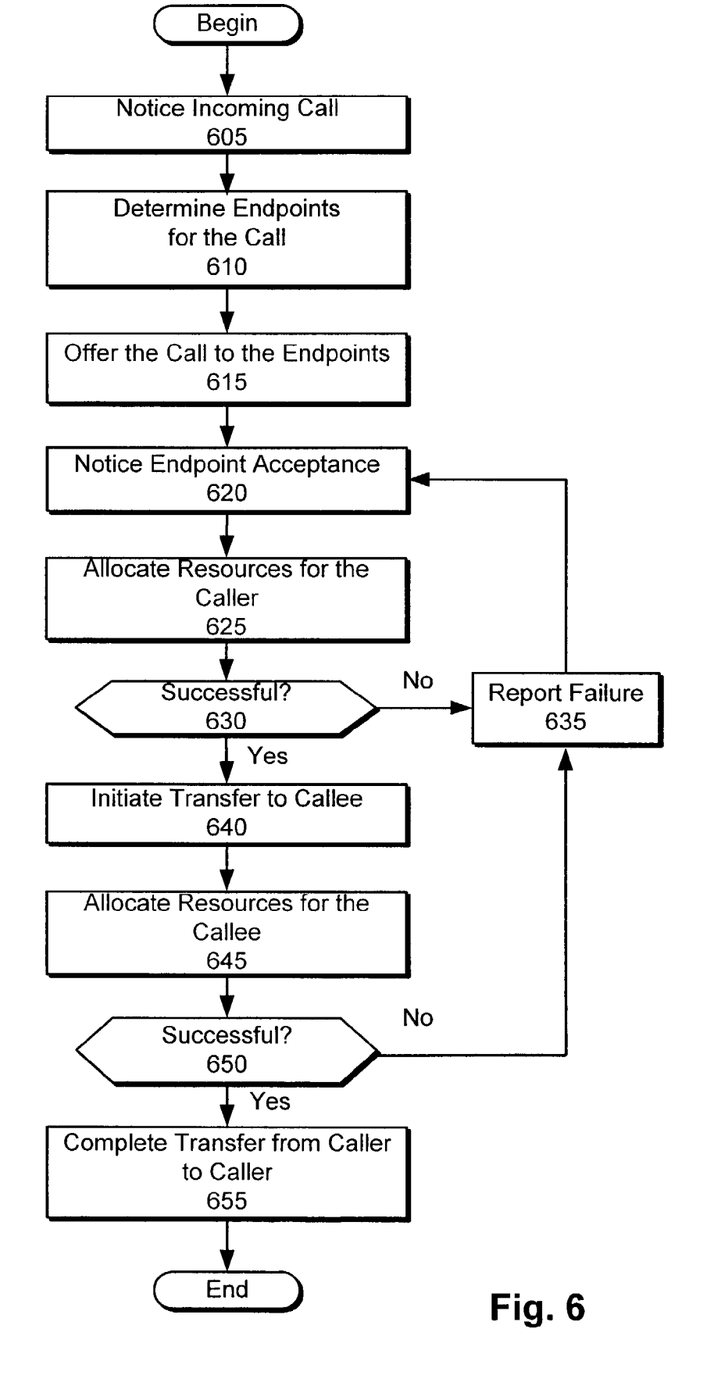
FIG. 6 is flowchart illustrating a method for performing resource allocation for a simultaneous hunt group according to one embodiment of the present invention.

FIG. 6 is flowchart illustrating a method for performing resource allocation for a simultaneous hunt group according to one embodiment of the present invention. The illustrated method begins with the call status module 320 noticing 605 the incoming call. The switch or server that notices 650 the incoming call then determines 610 the endpoint or group of endpoints that comprise the simultaneous hunt group. In one embodiment of the present invention, the switch or server includes a table that associates the destination telephone number or extension number with a group of extension numbers that represent the membership of the simultaneous hunt group.

The incoming call is then offered 615 to each endpoint in the simultaneous hunt group. In a distributed environment that includes multiple switches or sites, such as illustrated in FIG. 5, the switches communicate control packets to inform each other to ring a particular endpoint that is part of the simultaneous hunt group. In one embodiment of the present invention, resource allocation or admission control is not performed during the offering 615.

The call status modules 320 of the switch or switches that have endpoints ringing monitor the status. The call status module 320 notices 620 if the endpoint accepts the call. One example of call acceptance is an agent taking a conventional telephone device off-hook (i.e., picking up the handset). For other types of endpoints, such as computer workstations, pressing a button or clicking an icon with a mouse can also indicate call acceptance.

After an endpoint has accepted the incoming call, the switch or server performs resource allocation and call transfer. Because it is known that only one endpoint within the simultaneous hunt group will answer the incoming call (i.e., the callee), embodiments of the present invention allocate resources to establish a single communications channel along the media path that connects the caller and the callee. One advantage of not preallocating resources for each of the endpoints in the simultaneous hunt group is that there are no extra resources that need to be released for the endpoints that did not answer the incoming call. Also, preallocation inflates network usage and can result in other calls being denied resources that would otherwise be available.

As part of the transfer to the callee, resources are allocated 625 for the caller site. The caller site is the site in which the call originates. In one embodiment, the call transfer module 330 makes a resources allocation request to the resource management module 340. If resources are not available and the request is not successful 630, then a failure is reported 635. For example, the reporting module 350 can play a pre-recorded message such as "the call cannot be completed at this time."

In one embodiment, the failure is reported 635 to the callee, and the process returns to step 620. In step 620, the call status module 320 continues to notice 620 if an endpoint accepts the call. More specifically, the caller continues to hear ringing and the endpoints continue ringing until the transfer to the callee has been completed successfully. Because the system's resource usage is temporally dynamic, resources may be available by the time another agent answers the call.

If the resource request is successful at the caller site, then the transfer is initiated 640 to the callee site. Resources are then allocated 645 for the callee site. In one embodiment, the call transfer module 330 makes a resources allocation request to the resource management module 340. If resources are not available and the request is not successful 650, then a failure is reported 635 and, as described above, the process returns to step 620. For example, the reporting module 350 can play a pre-recorded message such as "the call cannot be completed at this time."

If the resource request is successful at the callee site, then sufficient resources are available along the media path to a establish communications channel from the caller to the callee. The call transfer module 330 then completes 655 the transfer and informs the switch or switches that have endpoints ringing as part of the simultaneous hunt group that the transfer has been completed.

One skilled in the art will appreciate that, in an embodiment of the present invention, a system architecture including a single switch can perform the resource allocation method illustrated, for example, in FIG. 6. In a system architecture that includes IP telephones, the IP telephones can be coupled to local or wide area networking devices in various sites or configurations. Admission control or resource reservation can be needed to communicate with IP telephones using resource-limited (e.g., bandwidth constrained) communications links.

Further, in an embodiment of the present invention, where it is known that a single endpoint or a predetermined number of endpoints communicates with another site using a resource-limited communication link, the step of allocating 625 resources for the caller site can be omitted. More specifically, where it is known that a communication link that couples a site to a wider area connection provides resources that equal or exceed that maximum potential resource usage of that site, admission control or preallocation of resources for communications channel is typically not required.

Figure 7:
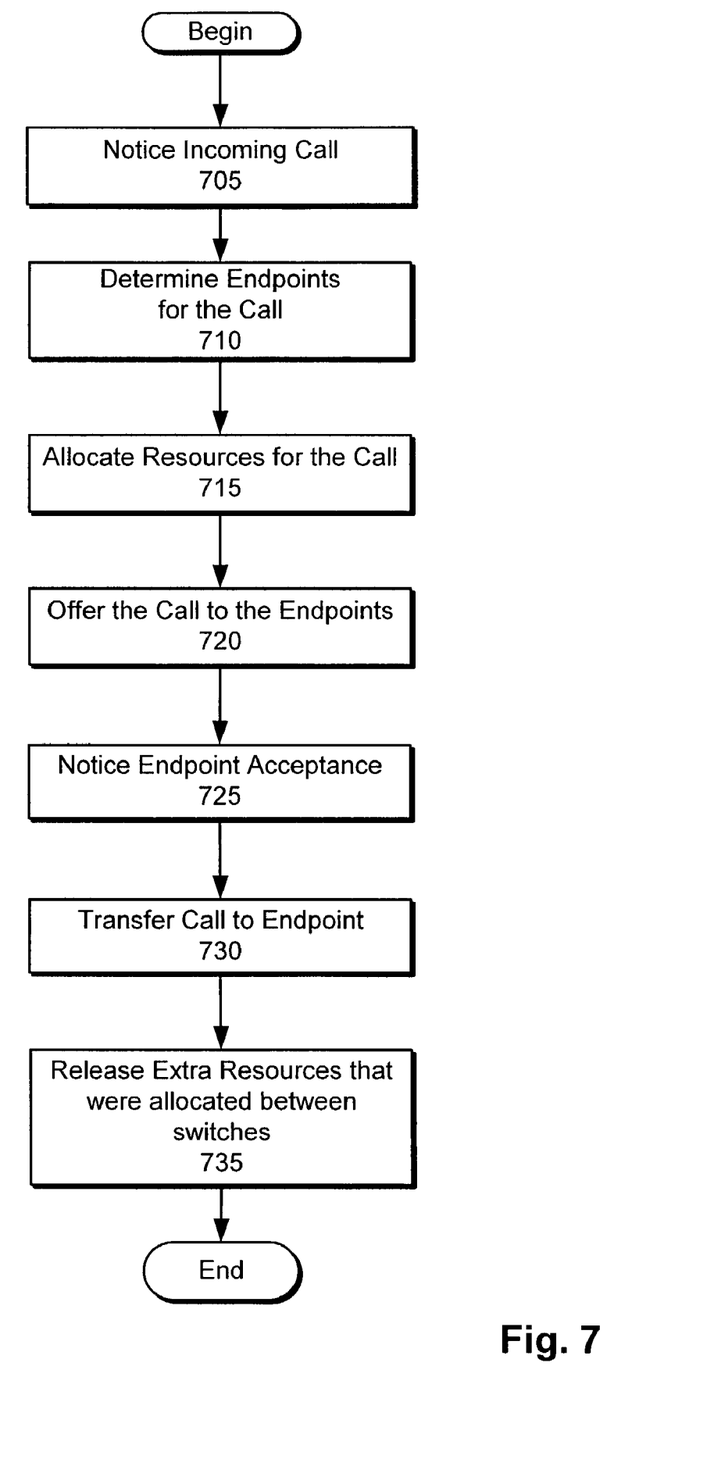
FIG. 7 is a flowchart illustrating a method for performing resource allocation for a simultaneous hunt group according to another embodiment of the present invention.

FIG. 7 is a flowchart illustrating a method for performing resource allocation for a simultaneous hunt group according to another embodiment of the present invention. Similar to the embodiment shown in FIG. 6, the process illustrated in FIG. 7 begins with noticing 705 an incoming call and determining 710 the endpoints for the call. After the endpoints are determined, resources are allocated 715 for the call. In this embodiment, communications channels are established between the affected switches and sites, then the call is offered 720 to the endpoints. Although it is known that only one agent or endpoint will eventually answer the call, some resources are preallocated along the potential media paths.

For the simultaneous hunt group illustrated in FIG. 5, for example, two communications channels are established over the first link 560. One of these two channels is for the endpoint 557 in the third site 550, if that endpoint is the one to answer the call. The other of the two channels is for one of the two endpoints 540, 542 in the second site 530, if one of those endpoints is the one to answer the call. Although extra resources are allocated along the potential media paths, one advantage of this allocation method is that a communications channel is not allocated for each of the endpoints that may answer the call.

After the call is offered 720 to the endpoints, the call status module 320 of the affected switches notices 725 an endpoint accept or answer the call. The caller is then transferred 730 along one of the established communications channels to the callee. Now that a particular one of the endpoints has answered the call, the potential media paths to other endpoints within the simultaneous hunt group are no longer needed. Therefore, the extra resources that were allocated between the switches are released 735. In one example implementation, the call transfer module 330 can inform the resource management module 340 to release the previously allocated resources.

Figure 8:
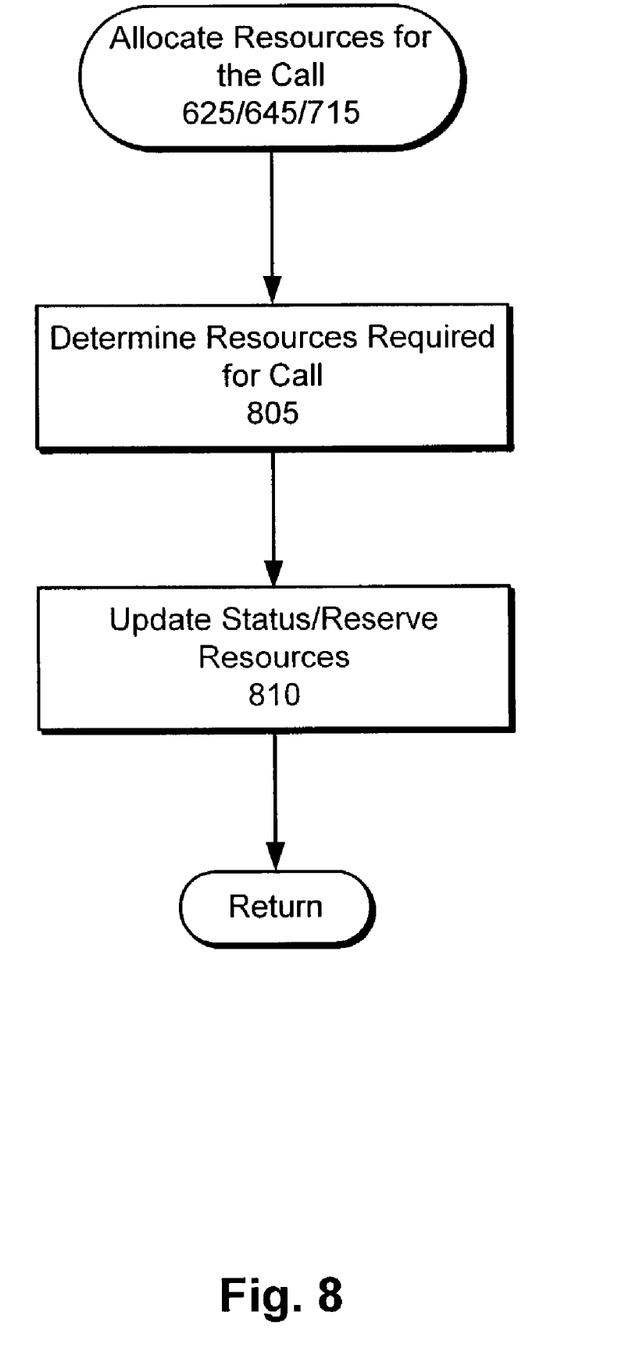
FIG. 8 is a flowchart illustrating a process for allocating resources according to one embodiment of the present invention.

FIG. 8 is a flowchart illustrating a process for allocating resources according to one embodiment of the present invention. FIG. 8 illustrates in further detail an exemplary process for allocating resources 625/645/715. The resource management module 340 or the resource monitor 430 determines 805 the resources required for the call. Depending on the desired voice quality, a typical communications channel can require 26 Kbps. That is, a typical duplex telephone conversion can require 52 Kbps for bi-directional communications channels. Call setup, control commands, resource allocation, or admission control data, for example, consume relatively few resources when compared with voice communications channels. Therefore the resource management module 340 or the resource monitor 430 generally monitor and manage the communications channel resources. In one embodiment, resource allocation is measured in units of a usage load. That is, the resource management module 340 is configured to allow a predetermined number of concurrent calls with a particular voice quality. The predetermined number can depend upon the data rate of the site's network connection. For example, with reference to FIG. 1A, if the first link 191 is capable of 1.55 Mbps, then the resource management module 340 for the first switch 120 and the second switch 130 can determine a usage load for the first site 110. In another embodiment of the present invention, the resource management module 340 can be configured to compare the bandwidth currently in use with the total bandwidth available on the wide area network connection or a bandwidth constrained site connection.

After the required resources are determined 805, the resource management module 340, updates status or reserves resources 810. The resource management module 340 grants resource allocation requests when the request will not cause the maximum throughput of the network connection to be exceeded. If the request is granted, the usage load or other status metric is updated 810. One skilled in the art will appreciate that, in order to maintain accuracy, the resource management module 340 can implement a serialized, transaction-based request system.

Having described embodiments of resource allocation for simultaneous hunt group (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A simultaneous hunt group system comprising:
   a first switch including a call status module for noticing an incoming call to the simultaneous hunt group and configured to offer the incoming call to an endpoint; and
   a second switch including a call transfer module, the second switch communicatively coupled to the first switch and to the endpoint, the call transfer module configured to notice the endpoint accept the incoming call offer, and responsive to the noticing, allocate resources for transferring the incoming call.

2. The system of claim 1 wherein the first switch is grouped within a first site and the second switch is grouped within a second site.

3. The system of claim 1 wherein at least one of the first switch and the second switch is coupled to a public switched telephone network.

4. The system of claim 1 wherein the endpoint is one of an analog telephone, an IP telephone, and a computing device.

5. The system of claim 1 wherein the first switch and the second switch further include a resource management module for managing resource usage.

6. A simultaneous hunt group computing device comprising:
   a call status module configured to notice an incoming call to the simultaneous hunt group and configured to offer the incoming call to an endpoint; and
   a call transfer module configured to notice the endpoint accept the incoming call offer, and responsive to noticing the endpoint accept, allocate resources for transferring the incoming call to the endpoint.

7. The device of claim 6 further comprising:
   a resource management module coupled to the call transfer module and configured maintain information about resource available on a resource-constrained communication link and to respond to resource reservation requests.

8. The device of claim 6 further comprising:
   a reporting module coupled to the call transfer module and configured to report whether resource allocation is successful.

9. The device of claim 6 wherein the endpoints comprise at least one of Internet protocol telephones and analog telephones.

10. The device of claim 6 further comprising a workgroup server configured to include the call status module and the call transfer module.

11. The device of claim 6 further comprising a switch configured to include the call status module and the call transfer module.

12. The device of claim 11 wherein the endpoints are coupled to the switch.

13. A resource allocation method for a simultaneous hunt group, the method comprising:
   noticing an incoming call;
   determining a plurality of endpoints for the incoming call;
   offering the incoming call to at least one of the plurality of endpoints;
   noticing one of the plurality of endpoints accept the incoming call; and
   responsive to noticing, allocating resources for transferring the incoming call to at least one of the plurality of endpoints.

14. The method of claim 13 further comprising:
   determining whether resource allocation is successful; and
   responsive to determining, initiating a transfer of the incoming call from to at least one of the plurality of endpoints.

15. The method of claim 13 wherein allocating resources further comprises reserving resources for at least one of a caller site and a callee site.

16. The method of claim 14 further comprising:
   responsive to determining whether resource allocation is successful, reporting unavailability of resources to at least one of the incoming caller and at least one of the plurality of endpoints.

17. The method of claim 13 wherein allocating resources for transferring the incoming call further comprises:
   determining an amount of resources needed to transfer the incoming call; and
   updating status to apportion the amount of resources needed.

18. A resource allocation method for a simultaneous hunt group, the method comprising:
   noticing an incoming call;
   determining a plurality of endpoints for the incoming call;
   responsive to determining the plurality of endpoints for the incoming call, allocating resources for a plurality of potential media paths to the plurality of endpoints;
   offering the incoming call to at least one of the plurality of endpoints;
   noticing one of the plurality of endpoints accept the incoming call; and
   transferring the incoming call to the one of the plurality of endpoints that accepted the incoming call using at least one of the plurality of potential media paths.

19. The method of claim 18 further comprising:
   releasing resources for the potential media paths that were not needed for transferring the incoming call.

20. The method of claim 18 wherein allocating resources further comprises reserving resources for at least one of a caller site and a callee site.

* * * * *